(12) United States Patent
Ito et al.

(10) Patent No.: US 7,480,313 B2
(45) Date of Patent: Jan. 20, 2009

(54) SDH ADD-DROP MULTIPLEXER THAT CAN REALIZE BOTH OPTICAL AND RADIO NETWORKS BY THE SAME DEVICE

(75) Inventors: Yoshio Ito, Minato-ku (JP); Katsushi Yamamoto, Minato-ku (JP)

(73) Assignee: NEC Corporation, Tokyo (JP)

( * ) Notice: Subject to any disclaimer, the term of this patent is extended or adjusted under 35 U.S.C. 154(b) by 623 days.

(21) Appl. No.: 11/262,925

(22) Filed: Nov. 1, 2005

(65) Prior Publication Data

US 2006/0092986 A1 May 4, 2006

(30) Foreign Application Priority Data

Nov. 2, 2004 (JP) ............................. 2004-319239

(51) Int. Cl.
*H04J 3/24* (2006.01)
(52) U.S. Cl. .................. 370/473; 370/535; 398/50; 398/56; 398/74
(58) Field of Classification Search .............. 370/473, 370/389, 575; 398/50, 56, 74
See application file for complete search history.

(56) References Cited

U.S. PATENT DOCUMENTS

| 5,739,935 A * | 4/1998 | Sabella ..................... 398/50 |
| 6,631,130 B1 * | 10/2003 | Roy et al. .................. 370/352 |
| 6,731,832 B2 * | 5/2004 | Alvarez et al. ................ 385/16 |
| 7,333,512 B2 * | 2/2008 | Kumar et al. ................ 370/473 |
| 2002/0048066 A1 * | 4/2002 | Antoniades et al. ......... 359/128 |
| 2002/0091982 A1 * | 7/2002 | Ohira et al. .................. 714/752 |

FOREIGN PATENT DOCUMENTS

| JP | 08-213965 A | 8/1996 |
| JP | 10-190602 A | 7/1998 |
| JP | 11-032042 A | 2/1999 |
| JP | 11-215013 A | 8/1999 |
| JP | 2000-165391 A | 6/2000 |
| WO | WO 02/51069 A2 | 6/2002 |

* cited by examiner

*Primary Examiner*—Chi H Pham
*Assistant Examiner*—Albert T Chou
(74) *Attorney, Agent, or Firm*—Sughrue Mion, PLLC (57) ABSTRACT

In an ADM device, first and second modulators and first and second demodulators are provided as a mod/demod device for radio communication, first to fourth SDH interface circuits and first and second SDH mapping/demapping circuits are provided for processing SDH signals, and path switching is performed by means of first and second signal branch circuits and first and second signal switches to enable simultaneous processing of both modulated signals and SDH signals. This configuration eliminates the need for outside mod/demod devices for radio communication when forming a radio network and therefore reduces the cost of constructing a system. In addition, the ability to simultaneously process modulated signals and SDH signals enables the simultaneous construction of an optical and radio network.

2 Claims, 7 Drawing Sheets

SDH ADD-DROP MULTIPLEXER THAT CAN REALIZE BOTH OPTICAL AND RADIO NETWORKS BY THE SAME DEVICE

BACKGROUND OF THE INVENTION

1. Field of the Invention

The present invention relates to an SDH add-drop multiplexer for adding, dropping, or passing through a signal of any channel of SDH (Synchronous Digital Hierarchy) signals in which signals of a plurality of channels have been multiplexed.

2. Description of the Related Art

In recent years, SDH (Synchronous Digital Hierarchy), which is standardized in ITU-T (International Telecommunications Union-Telecommunication Standardization Sector) and the ITU-R (ITU-Radio Communication sector), has come to be used as the standard of communication networks that are used in, for example, microwave communication systems. However, transmission standards known as PDH (Plesiochronous Digital Hierarchy) existed before this SDH was standardized.

In a PDH system in which PDH was used as the communication network standard, a signal that is to be transmitted is transmitted after first being converted to an SDH signal of, for example, an STM (Synchronous Transport Module)-1. In an SDH system in which SDH is used as the standard of a communication network, a signal that is to be transmitted is transmitted after first being converted to a PDH signal such as E1/T1.

STM-1 is one of the transmission units that are defined in SDH, and is a signal having a transmission speed of 155.52 Mbps. An E1 signal is the transmission unit in European hierarchy standards, and is a signal having a transmission speed of 2.048 Mbps. A T1 signal is the transmission unit in the hierarchy standards of North America and Japan and is a signal having a transmission speed of 1.544 Mbps.

An SDH signal that is used in this SDH system is a signal in which a plurality of channels have been multiplexed, and therefore requires the use of a total of two coaxial cables, one for input and one for output, for connecting two digital mod/demod devices. However, because a plurality of channels are multiplexed in a single signal, an SDH Add-Drop Multiplexer (hereinbelow abbreviated as "ADM") device is necessary for adding, dropping, or passing through the signal of any channel when dropping a portion of the channels or adding new channels midway.

Figure 1:
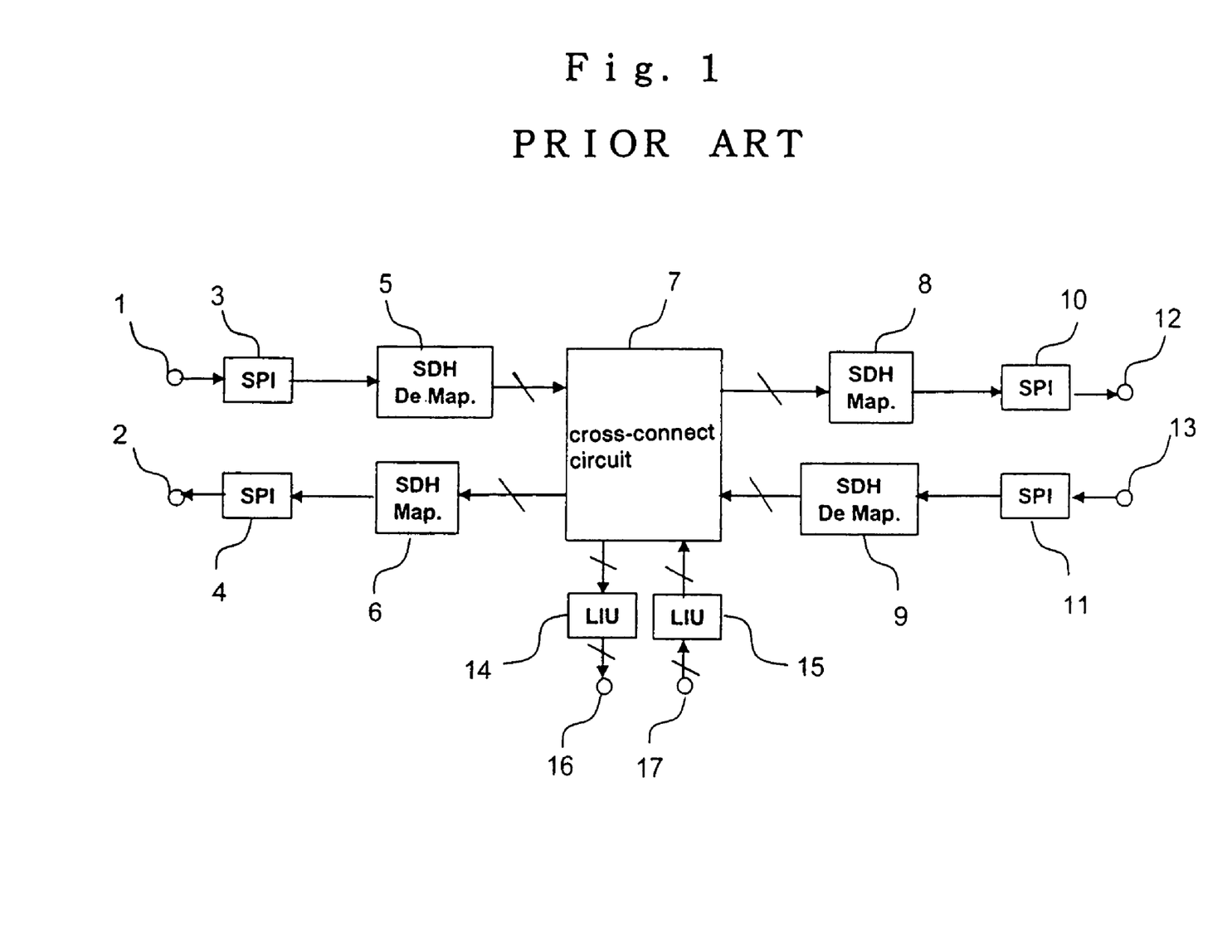
FIG. 1 is a block diagram showing the configuration of an ADM device of the prior art.

The following explanation regards the circuit configuration of such an ADM device of the prior art with reference to FIG. 1.

As shown in FIG. 1, this ADM device is made up from: SDH interface circuits (SPI: SDH Physical Interfaces) 3, 4, 10, and 11; SDH demapping circuits 5 and 9; SDH mapping circuits 6 and 8; cross-connect circuit 7; and PDH interface circuits (LIU: Line Interface Units) 14 and 15.

SDH interface circuit 3 receives as input an SDH signal such as an STM-1 signal from SDH signal input terminal 1; extracts the clock signal from the SDH signal of CMI (Code Mark Inversion) coding format that has been received as input and then converts to data of NRZ (Non Return to Zero) format; and finally supplies the result together with the extracted clock signal as output to SDH demapping circuit 5 of the next stage.

The signal that is received as input from the SDH signal input terminal 1 is in some cases an electrical signal and in other cases an optical signal. This electrical signal and optical signal are signals determined according to the standards of ITU-T, an electrical signal being a signal prescribed by ITU-T G.703, and an optical signal being prescribed by ITU-T G.957.

Thus, when the signal that is received as input from SDH signal input terminal 1 is an optical signal, SDH interface circuit 3 performs optical/electrical conversion instead of CMI code conversion, and supplies the data and clock that are obtained to SDH demapping circuit 5 of the next stage.

SDH demapping circuit 5 receives as input the data signal and clock signal that are supplied from SDH interface circuit 3, separates the signals of the plurality of channels that are multiplexed in this data signal, and supplies output to cross-connect circuit 7. For example, SDH demapping circuit 5 separates the signal from SDH interface circuit 3 into signals of 63 channels having a transmission speed of 2 Mbps and supplies the result to cross-connect circuit 7.

SDH mapping circuit 6 receives as input the clock signal and the digital signal of a plurality of channels that are supplied from cross-connect circuit 7; maps the digital signal of a plurality of channels based on a mapping method that is prescribed by ITU-T G.707; and supplies the result together with the clock signal to SDH interface circuit 4.

SDH interface circuit 4 converts the data signal and clock signal that are supplied from SDH mapping circuits 6 and 8 to an interface format (CMI coding format) that is prescribed by ITU-T G.703 and supplies the result as output from SDH signal output terminal 2. When the signal that is received as input from SDH mapping circuit 6 is an optical signal, SDH interface circuit 4 similarly converts to an optical signal of an interface format prescribed by G.957 and supplies the result as output.

The operations of SDH interface circuits 10 and 11, SDH mapping circuit 8, and SDH demapping circuit 9 are the same as the operations of SDH interface circuits 3 and 4, SDH mapping circuit 6, and SDH demapping circuit 5, respectively, and an explanation of these operations is therefore here omitted.

When SDH signal input terminals 1 and 13 and SDH signal output terminals 2 and 12 are used only for connection between devices, the interface standards may be original.

PDH interface circuit 15 receives a PDH baseband signal from PDH baseband signal input terminal 17 and converts to a digital signal of a format that allows processing in cross-connect circuit 7. More specifically, the PDH baseband signal that is received as input from PDH baseband input terminal 17 is a signal having a bipolar coding format, and PDH interface circuit 15 therefore extracts the clock signal from the PDH baseband signal that is received as input, converts the signal of bipolar format to a signal of unipolar format, and supplies the clock signal and signal that has been converted to unipolar format as output to cross-connect circuit 7.

PDH interface circuit 14 receives as input the unipolar signal and clock signal that are supplied from cross-connect circuit 7, converts the unipolar signal to a bipolar coding format, and supplies the result as output from PDH baseband signal output terminal 16.

Cross-connect circuit 7 is a circuit for switching paths by channel units for a signal of a plurality of channels that is received. More specifically, cross-connect circuit 7 branches (drops) and supplies to PDH interface circuit 14 a signal of a specific channel in signals of a plurality of channels that are received as input from SDH demapping circuits 5 and 9, inserts (adds) the signal that is received as input from PDH interface circuit 15 to the signals of the other channels, and supplies the result to SDH mapping circuits 6 and 8, respectively.

Figure 2:
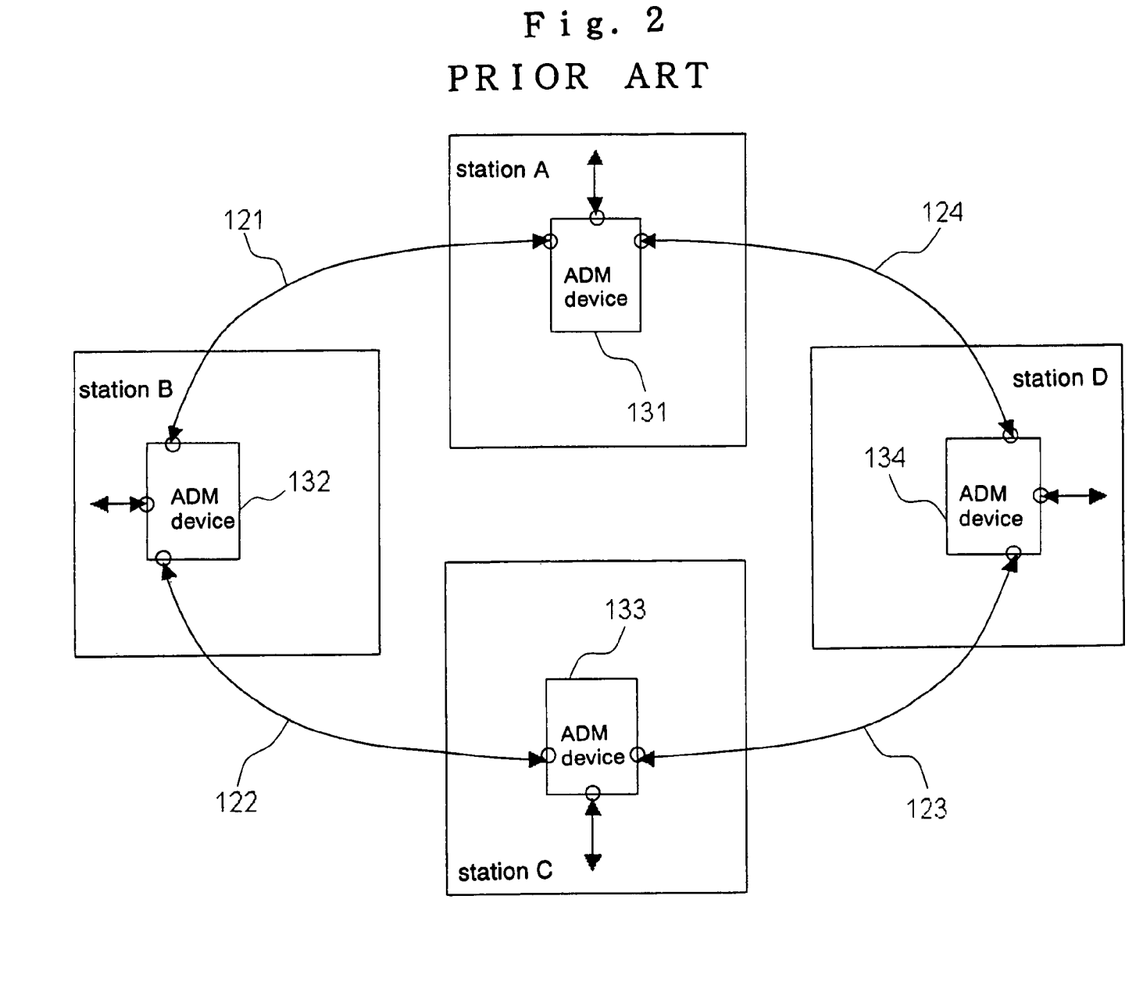
FIG. 2 is a system diagram for a case in which an optical ring network is configured using the ADM device of the prior art.

FIG. 2 next shows a system diagram for a case in which the ADM device of the prior art that is shown in FIG. 1 is used to make up an optical ring network. As shown in FIG. 2, this optical ring network is configured by connecting the four relay stations A, B, C, and D in a ring by means of optical cables 121-124. Each of stations A, B, C, and D is formed by ADM devices 131-134 of the configuration that is shown in FIG. 1.

ADM devices 131-134 of the configuration that is shown in FIG. 1 are of a configuration that can pass PDH signals through, or add PDH signals to or drop PDH signals from SDH signals that are received as input, and when an optical ring network is to be made up by these ADM devices 131-134, the SDH signal input/output terminals need only be connected by optical cables 121-124.

In a communication network system such as shown in FIG. 2, relay stations are connected together by optical cable, but in some cases, a radio ring network is used in which the relay stations are each connected by radio lines. A communication network that uses such a radio ring network is disclosed in, for example, JP-A-2000-165391.

Figure 3:
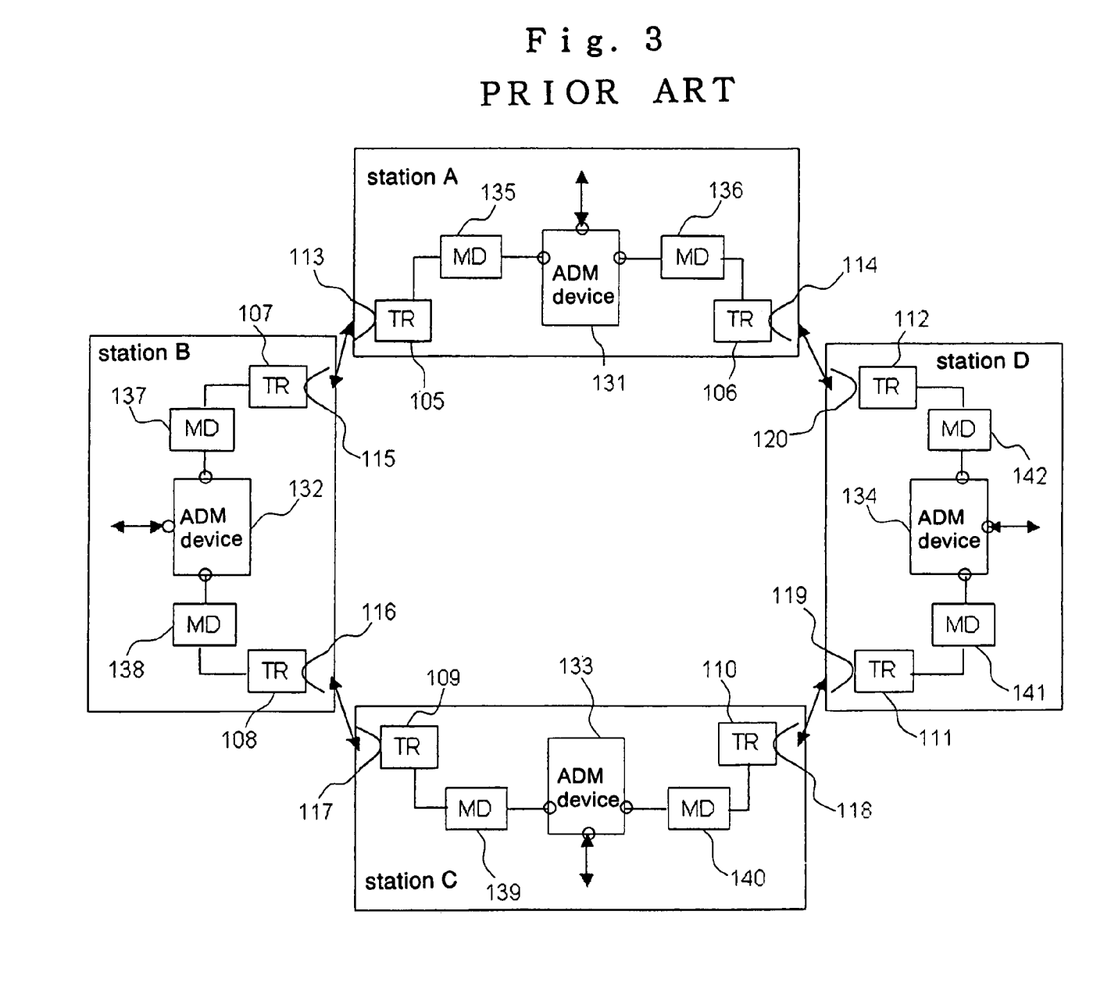
FIG. 3 is a system diagram for a case in which a radio ring network is configured using the ADM device of the prior art.

FIG. 3 shows a system diagram for a case in which ADM devices of the prior art that is shown in FIG. 1 are used to form a radio ring network. As shown in FIG. 3, this radio ring network has a configuration in which the four relay stations A, B, C, and D are connected by radio lines in a ring. Station A is made up from ADM device 131, mod/demod devices (MD) 135 and 136, transmitter-receivers (TR) 105 and 106, and antennas 113 and 114. Station B is made up from ADM device 132, mod/demod devices (MD) 137 and 138, transmitter-receivers (TR) 107 and 108, and antennas 115 and 116. Station C is made up from ADM device 133, mod/demod devices (MD) 139 and 140, transmitter-receivers (TR) 109 and 110, and antennas 117 and 118. Station D is made up from ADM device 134, mod/demod devices (MD) 141 and 142, transmitter-receivers (TR) 111 and 112, and antennas 119 and 120.

Figure 4:
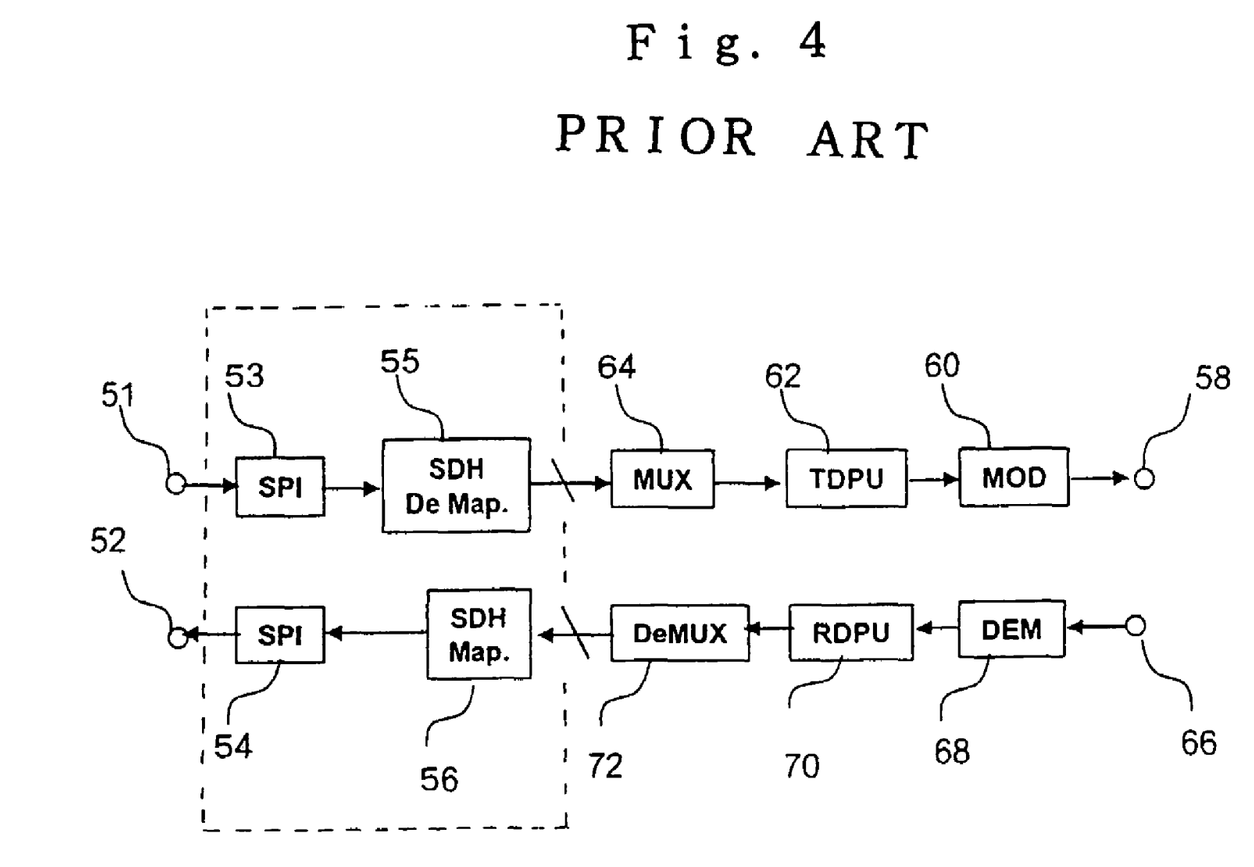
FIG. 4 is a block diagram showing the configuration of mod/demod devices 135-142 in FIG. 3.

In the radio ring network that is shown in FIG. 3, ADM devices 131-134 have a circuit configuration for the relay of SDH signals, and in order to make up a radio network, mod/demod devices 135-142 are necessary for converting the SDH signals from ADM devices 131-134 to modulated signals and supplying these signals to transmitter-receivers 105-112 and for converting the demodulated signals from transmitter-receivers 105-112 to SDH signals. FIG. 4 shows the configuration of these mod/demod devices 135-142.

As shown in FIG. 4, mod/demod devices 135-142 are each made up from: SDH interface circuits (SPI) 53 and 54, SDH demapping circuit 55, SDH mapping circuit 56, signal multiplexer (MUX) 64, signal demultiplexer (DeMUX) 72, transmission digital processing unit (TDPU) 62, reception digital processing unit (RDPU) 70, modulator (MOD) 60, and demodulator (DEM) 68; and each subject an SDH signal that is received as input from SDH signal input terminal 51 to SDH demapping, signal multiplexing, transmission digital processing, and modulation to supply the signal from modulated signal output terminal 58; or subject a modulated signal that is received as input from modulated signal input terminal 66 to demodulation, reception digital processing, signal demultiplexing, and SDH mapping to supply the signal from SDH signal output terminal 52.

The processing in SDH interface circuits 53 and 54, SDH demapping circuit 55, and SDH mapping circuit 56 is the same as the processing in SDH interface circuits 3 and 4, SDH demapping circuit 5, and SDH mapping circuit 6, respectively, that are shown in FIG. 1, and explanation is therefore here omitted.

Signal multiplexer 64 multiplexes a data signal that is received as input from SDH demapping circuit 55 and having a transmission speed of 2 Mbps.

Transmission digital processing unit 62 subjects the multiplexed digital signal that is received as input from signal multiplexer 64 to both speed conversion for adding redundant bits (for example, error correction bits) that are characteristic to a radio interval and row conversion that corresponds to the modulation mode of modulator 60.

Modulator 60 modulates the digital signal that is received as input from transmission digital processing unit 62 and supplies the obtained modulated signal from modulated signal output terminal 58.

Demodulator 68 demodulates the modulated signal that is received as input from modulated signal input terminal 66 to convert the signal to a digital signal and supplies the obtained digital signal to reception digital processing unit 70.

Reception digital processing unit 70 receives the digital signal from demodulator 68 and subjects the signal to digital processing that corresponds to the digital processing that was performed in transmission digital processing unit 62 on the opposite side of the radio link.

Signal demultiplexer 72 demultiplexes the data signal that is received as input from reception digital processing unit 70 into a digital signal of a plurality of rows and supplies the obtained digital signal to SDH mapping circuit 56.

As described in the foregoing explanation, the ADM device of the prior art having the configuration shown in FIG. 1 has only SDH signal input/output terminals 1, 2, 12, and 13 as terminals for receiving and supplying signals that are to be relayed, and therefore, the outside provision of mod/demod devices 135-142 and transmitter-receivers 105-112 is necessary when this ADM device is used to construct a radio network as shown in FIG. 3.

However, as can be seen from a comparison of FIG. 1 and FIG. 4, when SDH signal output terminal 12 and SDH signal input terminal 51 are connected and SDH signal input terminal 11 and SDH signal output terminal 52 are connected, SDH mapping circuit 8, SDH demapping circuit 9, and SDH interface circuits 10 and 11 in the ADM device duplicate the functions of SDH interface circuits 53 and 54, SDH demapping circuit 55, and SDH mapping circuit 56 in the mod/demod device; resulting in the disadvantage of increased cost for configuring the system.

Based on the circuit configuration of the ADM device that is shown in FIG. 1, it is believed that this disadvantage can be prevented by adopting a configuration in which SDH mapping circuit 8, SDH demapping circuit 9, and SDH interface circuits 10 and 11 are independent. However, because the connections between cross-connect circuit 7, and SDH mapping circuit 8 or SDH demapping circuit 9 are signals of a plurality of rows, adopting a device in which SDH mapping circuit 8, SDH demapping circuit 9, and SDH interface circuits 10 and 11 are separate configurations necessitates many cables to interconnect devices and thus has the counterproductive result of increasing costs. In particular, constructing an optical ring network as shown in FIG. 2 results in excessive additional cable connections in each relay station and increases the cost of building the system.

In addition, data back-up may be performed for data of both an optical network and radio network to ensure data transmission even in the event of problems on the network such as disconnection of an optical cable and thus improve the reliability of a system. In an ADM device of the prior art, however, connecting a mod/demod device to SDH input/output terminals prevents the construction of an optical network, and using an ADM device of the prior art when backing up optical and radio networks therefore necessitated completely separate system configurations for each of the optical system and radio system.

SUMMARY OF THE INVENTION

It is an object of the present invention to provide an SDH add-drop multiplexer that can reduce costs for configuring a system by not necessitating the outside provision of a mod/demod device for radio communication even when constructing a radio network and that does not result in the duplication of circuit components, and further, that can realize an optical and radio network by means of the same device.

The present invention is applied to an SDH add-drop multiplexer for adding, dropping, or passing through the signal of any channel with respect to an SDH signal in which signals of a plurality of channels are multiplexed.

To achieve the above-described object, the SDH add-drop multiplexer of the present invention is provided with: first, second, third, and fourth SDH interface circuits, first and second SDH demapping circuits, first and second SDH mapping circuits, first and second signal multiplexers, first and second transmission digital processing units, first and second modulators, first and second demodulators, first and second reception digital processing units, first and second signal demultiplexers, first and second signal switches, first and second signal branch circuits, first and second PDH interface circuits, and a cross-connect circuit.

The first SDH interface circuit extracts a clock signal from an SDH signal that is received as input from a first SDH signal input terminal, converts the coding format of the SDH signal, and supplies as output the converted signal together with the extracted clock signal.

The first SDH demapping circuit receives as input the data signal and clock signal that are supplied from the first SDH interface circuit and demultiplexing the signals of a plurality of channels that are multiplexed in the data signal.

The first SDH mapping circuit receives a clock signal and a digital signal of a plurality of channels, maps the received digital signal based on a mapping method that has been prescribed in advance, and supplies the mapped digital signal together with the clock signal.

The second SDH interface circuit converts the data signal and clock signal that are supplied from the first SDH mapping circuit to a SDH signal of a prescribed interface format and supplies the converted signals as output from a first SDH signal output terminal.

The first signal multiplexer multiplexes the data signal of a plurality of channels that has been received and supplies the result as output.

The first transmission digital processing unit subjects the multiplexed digital signal that is supplied as output from the first signal multiplexer to a digital process that corresponds to the modulation method performed during modulation.

The first modulator modulates the digital signal that is received as input from the first transmission digital processing unit and supplies the modulated signal that is obtained from a first modulated signal output terminal.

The first demodulator demodulates the modulated signal that is received as input from a first modulated signal input terminal to convert the signal to a digital signal.

The first reception digital processing unit receives the digital signal that has been demodulated by the first demodulator and performs a digital process that corresponds to the digital process performed in the first transmission digital processing unit.

The first signal demultiplexer demultiplexes the data signal that is supplied from the first reception digital processing unit into a digital signal of a plurality of channels and supplies the result as output.

The first signal switch receives as input the digital signal of a plurality of channels from the first SDH demapping circuit and the digital signal of a plurality of channels from the first signal demultiplexer and, based on settings that have been determined in advance, selects the signal that is received from either path for each channel and supplies the result as output.

The first signal branch circuit receives as input a digital signal of a plurality of channels and a clock signal, branches only the signal of a channel that has been set in advance, supplies the result to the first signal multiplexer, and supplies the signal of the other channels to the first SDH mapping circuit.

The third SDH interface circuit extracts a clock signal from an SDH signal that is received from the second SDH signal input terminal, converts the coding format of the SDH signal, and supplies the converted SDH signal together with the extracted clock signal as output.

The second SDH demapping circuit receives as input the clock signal and data signal that are supplied from the third SDH interface circuit and demultiplexes the signals of a plurality of channels that are multiplexed in the data signal.

The second SDH mapping circuit receives a digital signal of a plurality of channels and a clock signal, maps the received digital signal based on a mapping method that has been prescribed in advance, and supplies as output the mapped digital signal together with the received clock signal.

The fourth SDH interface circuit converts the data signal and clock signal that are supplied as input from the second SDH mapping circuit to an SDH signal of a prescribed interface format and supplies the result from a second SDH signal output terminal.

The second signal multiplexer multiplexes and supplies the data signal of a plurality of channels that has been received as input.

The second transmission digital processing unit subjects the multiplexed digital signal that is supplied from the second signal multiplexer to a digital process that corresponds to the modulation method used during modulation.

The second modulator modulates the digital signal that is received from the second transmission digital processing unit and supplies the obtained modulated signal from a second modulated signal output terminal.

The second demodulator demodulates the modulated signal that is received from the second modulated signal input terminal to convert the modulated signal to a digital signal.

The second reception digital processing unit receives the digital signal that has been demodulated by the second demodulator and performs a digital process that corresponds to the digital process that was performed in the second transmission digital processing unit.

The second signal demultiplexer demultiplexes the data signal that is supplied from the second reception digital processing unit into a digital signal of a plurality of channels and supplies the result as output.

The second signal switch receives as input the digital signal of a plurality of channels from the second SDH demapping circuit and the digital signal of a plurality of channels from the second signal demultiplexer, and, based on settings that have been determined in advance, selects and supplies the signal that is received from either path for each channel.

The second signal branch circuit receives a digital signal of a plurality of channels and a clock signal, branches only the signal of a channel that has been set in advance and supplies this branched signal to the second signal multiplexer, and supplies the signal of the other channels to the second SDH mapping circuit.

The first PDH interface circuit extracts a clock signal from a PDH baseband signal that is received from a PDH baseband signal input terminal, converts the PDH baseband signal that has been received to a digital signal of a format that has been set in advance, and supplies as output the converted digital signal together with the extracted clock signal.

The second PDH interface circuit converts a digital signal that has been received as input to a signal of a coding format that has been set in advance and supplies the converted digital signal as output from a PDH baseband signal output terminal.

The cross-connect circuit branches (drops) a signal of a specific channel in a signal of a plurality of channels that is received as input from the first and second signal switches and supplies the branched signal to the second PDH interface circuit; and inserts (adds) a signal that is received as input from the first PDH interface circuit to the signal of the other channels and supplies the result to each of the first and second signal branch circuits.

In the present invention, an ADM device is provided with first and second modulators and first and second demodulators as a mod/demod device for radio communication, is provided with first to fourth SDH interface circuits and first and second SDH mapping/demapping circuits for processing SDH signals, and first and second signal branch circuits and first and second signal switch circuits realize switching of paths, whereby both a modulated signal and an SDH signal can be simultaneously processed. As a result, the need for an outside mod/demod device for radio communication is eliminated even when constructing a radio network, whereby costs for building a system can be reduced. In addition, the ability to simultaneously process both a modulated signal and an SDH signal enables the simultaneous construction of an optical and radio network.

In addition, the second and fourth SDH interface circuits may convert the data signal and clock signal that are supplied from the first and second SDH mapping circuits to an interface format that is prescribed by ITU-T G.703 and may supply the converted signals from the first and second SDH signal output terminals, respectively.

The above and other objects, features, and advantages of the present invention will become apparent from the following description with reference to the accompanying drawings, which illustrate examples of the present invention.

DETAILED DESCRIPTION OF THE PREFERRED EMBODIMENTS

The following explanation regards an embodiment of the present invention with reference to the accompanying drawings.

Figure 5:
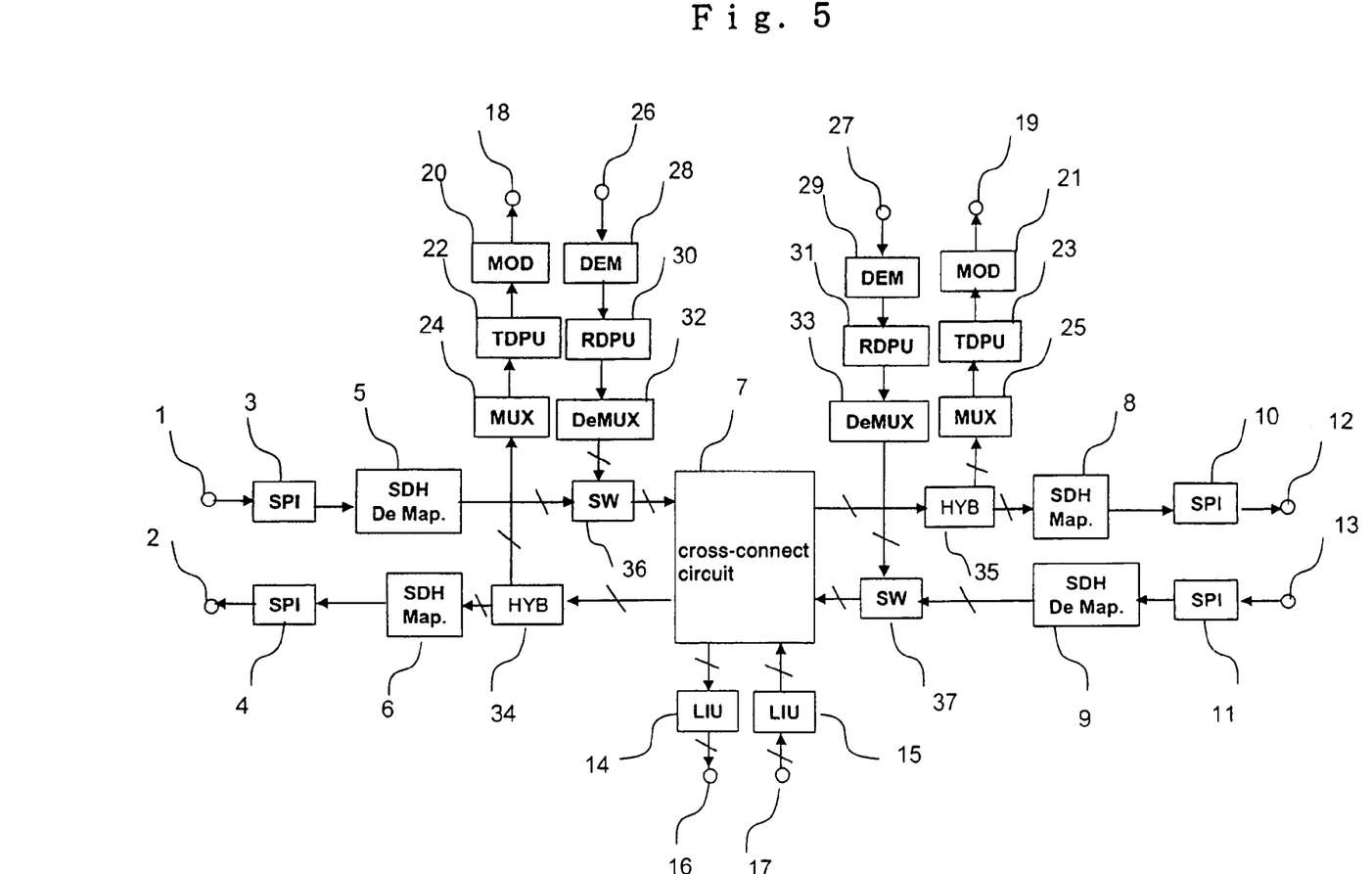
FIG. 5 is a block diagram showing the configuration of an ADM device of an embodiment of the present invention.

FIG. 5 is a block diagram showing the configuration of an ADM device according to an embodiment of the present invention. In FIG. 5, constituent elements that are identical to constituent elements in FIG. 1 are given the same reference numerals, and redundant explanation is omitted.

As shown in FIG. 5, the ADM device of the present embodiment is made up from: SDH interface circuits (SPI) 3, 4, 10, and 11; SDH demapping circuits 5 and 9; SDH mapping circuits 6 and 8; cross-connect circuit 7; PDH interface circuits (LIU) 14 and 15; modulators (MOD) 20 and 21; transmission digital processing units (TDPU) 22 and 23; signal multiplexers (MUX) 24 and 25; demodulators (DEM) 28 and 29; reception digital processing units (RDPU) 30 and 31; signal demultiplexers (DeMUX) 32 and 33; signal branch circuits (HYB) 34 and 35; and signal switches (SW) 36 and 37.

The ADM device of the present embodiment is a configuration in which modulators 20 and 21, transmission digital processing units 22 and 23, signal multiplexers 24 and 25, demodulators 28 and 29, reception digital processing units 30 and 31, signal demultiplexers 32 and 33, signal branch circuits 34 and 35, and signal switches 36 and 37 are newly added to the ADM device of the prior art that is shown in FIG. 1.

Signal branch circuit 34 receives a digital signal of a plurality of channels and a clock signal that are supplied from cross-connect circuit 7, branches (drops) only a signal of a channel that has been set in advance and supplies the signal to signal multiplexer 24, and supplies the signal of other channels to SDH mapping circuit 6.

Signal multiplexer 24 multiplexes a data signal of N rows (where N=63) each having a transmission speed of 2 Mbps that has been branched by signal branch circuit 34 and performs an N-M row conversion for converting the signal to a digital signal of M rows. Here, the value of M is set as appropriate depending on the hardware configuration, but in the present embodiment, explanation is for a case in which M=8.

Transmission digital processing unit 22 receives as input a multiplexed digital signal of M rows that is supplied from signal multiplexer 24, both performs a speed conversion for, for example, adding redundant bits (for example, error correction bits) that are characteristic of the radio interval and performs a row conversion that corresponds to the modulation method of modulator 20. For example, if the modulation method of modulator 20 is a 128 QAM (Quadrature Amplitude Modulation) method, transmission digital processing unit 22 converts the signal from signal multiplexer 24 to a clock signal and a data signal of 7 rows and supplies the result to modulator 20.

Modulator 20 modulates the digital signal that is received from transmission digital processing unit 22 and supplies the obtained modulated signal from modulated signal output terminal 18.

The operations of signal multiplexer 25, transmission digital processing unit 23, and modulator 21 are the same as the operations of signal multiplexer 24, transmission digital processing unit 22, and modulator 20, respectively, and redundant explanation is therefore here omitted.

Demodulator 28 demodulates the modulated signal that is received from modulated signal input terminal 26 to convert the signal to a digital signal and supplies the digital signal to reception digital processing unit 30.

Reception digital processing unit 30 receives the digital signal from demodulator 28 and performs a digital process that corresponds to the digital process that is performed in transmission digital processing unit 22 on the opposite side of the radio link. More specifically, reception digital processing unit 30 uses error correction bits that are added in transmission digital processing unit 22 to effect error correction (Forward Error Correction: FEC) and then deletes the error correction redundant bits and supplies a data signal of M rows to signal demultiplexer 32.

Signal demultiplexer 32 demultiplexes the data signal of M rows that is received from reception digital processing unit 32 to a digital signal of N rows and supplies the digital signal to signal switch 36.

Signal switch 36 receives a digital signal of a plurality of channels from SDH demapping circuit 5 and a digital signal of a plurality of channels from signal demultiplexer 32, and, based on settings that have been determined in advance, selects a signal that has been received from either path for each channel and supplies the selected signal to cross-connect circuit 7.

The operations of demodulator 29, reception digital processing unit 31, and signal demultiplexer 33 are identical to the operations of demodulator 28, reception digital processing unit 30, and signal demultiplexer 32, respectively, and redundant explanation is therefore here omitted.

The operations of signal branch circuit 35 and signal switch 37 are also identical to the operations of signal branch circuit 34 and signal switch 36, respectively, and redundant explanation is therefore omitted.

Cross-connect circuit 7 in the present embodiment branches (drops) a signal of a specific channel in the signals of a plurality of channels that are received as input from signal switches 36 and 37 and supplies this signal to PDH interface circuit 14, and further, inserts (adds) the signal that is received from PDH interface circuit 15 to the signal of the other channels and supplies the result to each of signal branch circuits 34 and 35.

The following explanation regards the details of the operation of the ADM device of the present embodiment with reference to FIG. 5.

In FIG. 5, the SDH signal that is received from SDH signal input terminal 1 (13) passes through SDH interface circuit 3 (11), is demultiplexed into a plurality of signals of 2 Mbps by SDH demapping circuit 5 (9), and applied as input to signal switch 36 (37). On the other hand, the intermediate frequency signal from a receiver that is applied as input to modulated signal input terminal 26 (27) is demodulated to a digital signal by demodulator 28 (29), passes through reception digital processing unit 30 (31), and is demultiplexed into a plurality of signals of 2 Mbps by signal demultiplexer 32 (33).

The signal that has been demultiplexed by this signal demultiplexer 32 (33) or the signal from the above-described SDH demapping circuit 5 (9) is selected by signal switch 36 (37), the selected signal is applied as input to cross-connect circuit 7, a portion of a plurality of signals each equivalent to 2 Mbps is applied as input as necessary to signal branch circuit 35 (34), and the other 2-Mbps signals pass through PDH interface circuit 14 and are supplied as output to another device from PDH baseband signal output terminal 16.

Alternatively, a signal equivalent to 2 Mbps that is applied as input to signal branch circuit 35 (34) is applied to SDH mapping circuit 8 (6) and signal multiplexer 25 (24). The signal that is received in SDH mapping circuit 8 (6) is multiplexed to an SDH signal, passes through SDH interface circuit 10 (4), and is supplied as output to other devices from SDH signal output terminal 12 (2); and the signal that is received in signal multiplexer 25 (24), after being multiplexed, is modulated by transmission digital processing unit 23 (22) and modulator 21 (20) and supplied as output to a transmitter from modulated signal output terminal 19 (18).

Figure 6:
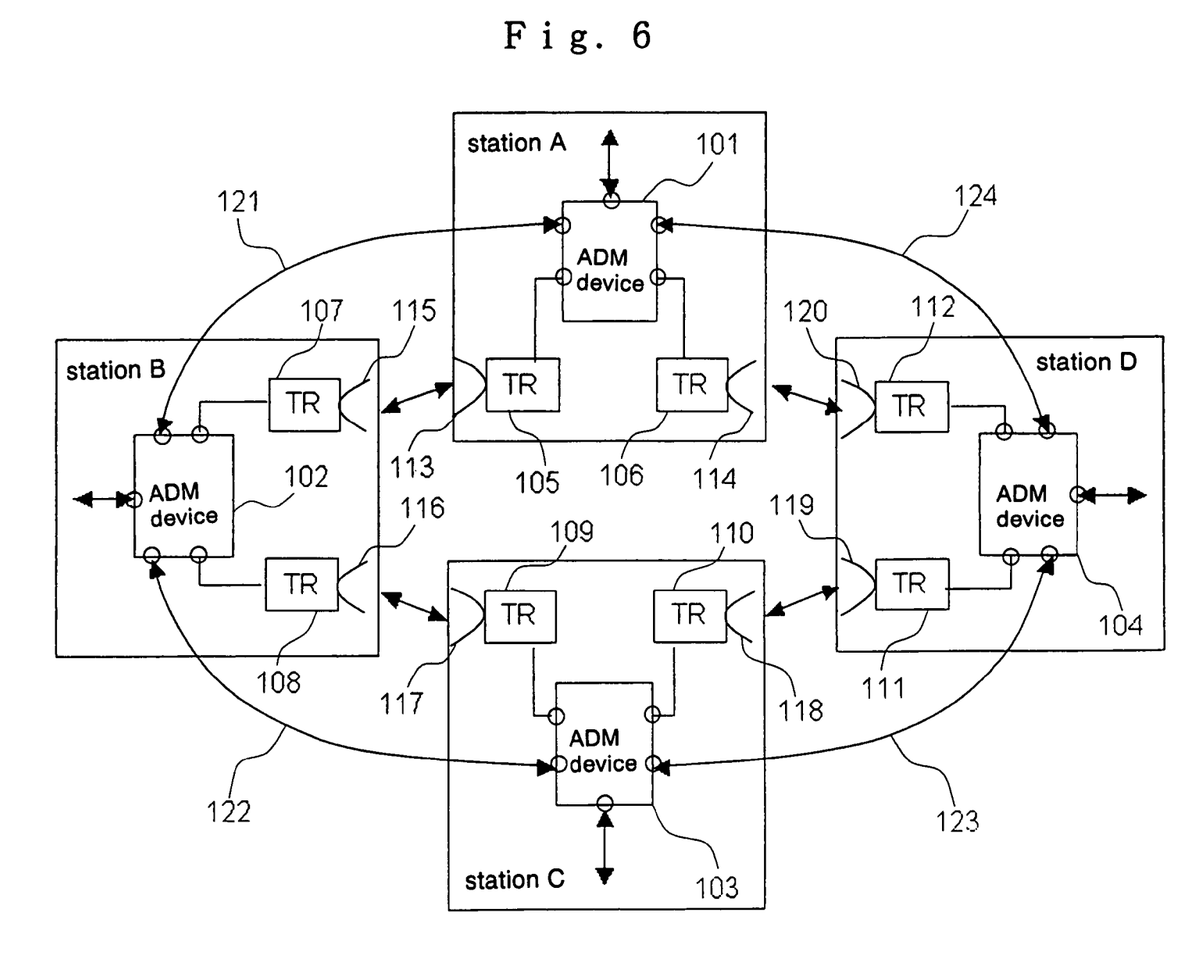
FIG. 6 is a system diagram for a case in which an optical and radio ring network is configured using the ADM device according to an embodiment of the present invention.
Figure 7:
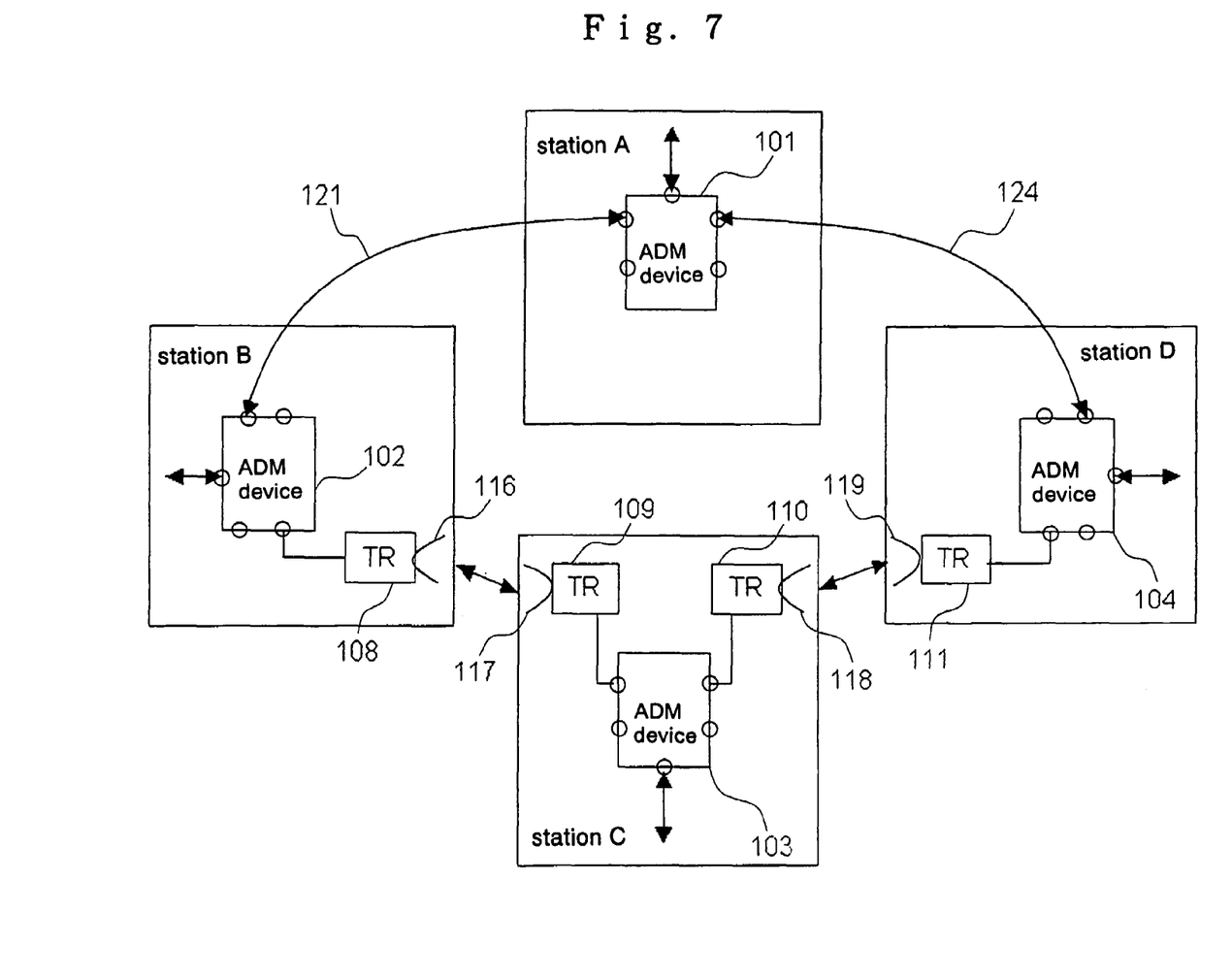
FIG. 7 is a system diagram for a case in which an optical and radio mixed network is configured using the ADM device according to an embodiment of the present invention.

FIG. 6 and FIG. 7 show system diagrams for cases in which the ADM device of the present embodiment is used to configure communication networks.

FIG. 6 shows an example in which ADM devices of the present embodiment are used to configure optical and radio ring networks. The optical and radio ring network that is shown in FIG. 6 is made up from four relay stations, stations A, B, C, and D, which are connected in a ring by optical cables 121-124 and radio lines.

Stations A is made up from ADM device 101, transmitter-receivers (TR) 105 and 106, and antennas 113 and 114; station B is made up from ADM device 102, transmitter-receivers 107 and 108, and antennas 115 and 116; station C is made up from ADM device 103, transmitter-receivers 109 and 110, and antennas 117 and 118; and station D is made up from ADM device 104, transmitter-receivers 111 and 113, and antennas 119 and 120.

In stations A, B, C, and D in FIG. 6, optical and radio ring networks are simultaneously realized by connecting the SDH signal input/output terminals of each of ADM devices 101-104 by optical cables 121-124; connecting the modulated signal input/output terminals of each of ADM devices 101-104 to transmitter-receivers 105-112; and the interconnection by radio between transmitter-receivers 105-112 by way of antennas 113-120.

As can be readily understood by referring to FIG. 6, ADM devices 101-104 of the present embodiment are simultaneously provided with optical SDH interfaces and modulated signal input/output interfaces, whereby optical and radio networks are constituted by the same device and can be used as back-up lines for each other. However, outside optical cables are necessary for connection when the ADM devices are used to construct an optical network, and outside transmitter-receivers and antennas are necessary for connection when the ADM devices are used to construct a radio network.

FIG. 7 shows an example in which the ADM device of the present embodiment is used to construct an optical and radio mixed network. The optical and radio mixed network that is shown in FIG. 7 is made up from stations A, B, C, and D, where station A is made up from ADM device 101; station B is made up from ADM device 102, transmitter-receiver 108, and antenna 116; station C is made up from ADM device 103, transmitter-receivers 109 and 110, and antennas 117 and 118; and station D is made up from ADM device 104, transmitter-receiver 111, and antenna 119.

In addition, stations A and B are connected by optical cable 121 and stations A and D are connected by optical cable 124, while stations B and C and stations C and D are connected by radio lines. A ring network is thus constructed in which optical and radio connections are mixed.

Through the use of ADM devices 101-104 in the present embodiment, optical and radio networks can be mixed by means of the same device within the same network by selecting an optical SDH interface and a modulated signal input/output interface as necessary.

While preferred embodiments of the present invention have been described using specific terms, such description is for illustrative purposes only, and it is to be understood that changes and variations may be made without departing from the spirit or scope of the following claims.

What is claimed is:

1. An SDH add-drop multiplexer for adding, dropping, or passing through a signal of any channel with respect to an SDH signal in which signals of a plurality of channels are multiplexed; said SDH add-drop multiplexer comprising:

a first SDH interface circuit for extracting a clock signal from an SDH signal that is received as input from a first SDH signal input terminal, converting the coding format of said SDH signal, and supplying as output the converted signal together with said extracted clock signal;

a first SDH demapping circuit for receiving as input the data signal and clock signal that are supplied from said first SDH interface circuit and demultiplexing signals of a plurality of channels that are multiplexed in the data signal;

a first SDH mapping circuit for receiving a clock signal and a digital signal of a plurality of channels, mapping the received digital signal based on a mapping method that has been prescribed in advance, and supplying the mapped digital signal together with said clock signal that was received as input;

a second SDH interface circuit for converting the data signal and clock signal that are supplied from said first SDH mapping circuit to an SDH signal of a prescribed interface format and supplying the converted signals as output from a first SDH signal output terminal;

a first signal multiplexer for multiplexing a data signal of a plurality of channels that has been received and supplying the result as output;

a first transmission digital processing unit for subjecting a multiplexed digital signal that is supplied as output from said first signal multiplexer to a digital process that corresponds to the modulation method performed during modulation;

a first modulator for modulating a digital signal that is received as input from said first transmission digital processing unit and supplying the modulated signal that is obtained from a first modulated signal output terminal;

a first demodulator for demodulating the modulated signal that is received as input from a first modulated signal input terminal to convert the modulated signal to a digital signal;

a first reception digital processing unit for receiving a digital signal that has been demodulated by said first demodulator and performing a digital process that corresponds to the digital process performed in said first transmission digital processing unit;

a first signal demultiplexer for demultiplexing the data signal that is supplied from the first reception digital processing unit into a digital signal of a plurality of channels and supplying the result as output;

a first signal switch for receiving as input a digital signal of a plurality of channels from said first SDH demapping circuit and a digital signal of a plurality of channels from said first signal demultiplexer and, based on predetermined settings, selecting a signal that is received from either path for each channel and supplying the result as output;

a first signal branch circuit for receiving as input a digital signal of a plurality of channels and a clock signal, branching only the signal of a channel that has been set in advance, supplying the result to said first signal multiplexer, and supplying the signal of other channels to said first SDH mapping circuit;

a third SDH interface circuit for extracting a clock signal from an SDH signal that is received from a second SDH signal input terminal, converting the coding format of said SDH signal, and supplying as output the converted SDH signal together with said extracted clock signal;

a second SDH demapping circuit for receiving as input the clock signal and data signal that are supplied from said third SDH interface circuit and demultiplexing signals of a plurality of channels that are multiplexed in the data signal;

a second SDH mapping circuit for receiving a digital signal of a plurality of channels and a clock signal, mapping the received digital signal based on a mapping method that has been prescribed in advance, and supplying the mapped digital signal together with said received clock signal;

a fourth SDH interface circuit for converting a data signal and a clock signal that are supplied as input from said second SDH mapping circuit to an SDH signal of a prescribed interface format and supplying the result from a second SDH signal output terminal;

a second signal multiplexer for multiplexing and supplying a data signal of a plurality of channels that has been received as input;

a second transmission digital processing unit for subjecting a multiplexed digital signal that is supplied from said second signal multiplexer to a digital process that corresponds to the modulation method used during modulation;

a second modulator for modulating a digital signal that is received from said second transmission digital processing unit and supplying the obtained modulated signal as output from a second modulated signal output terminal;

a second demodulator for demodulating a modulated signal that is received from a second modulated signal input terminal to convert the modulated signal to a digital signal;

a second reception digital processing unit for receiving the digital signal that has been demodulated by said second demodulator and performing a digital process that corresponds to the digital process that was performed in said second transmission digital processing unit;

a second signal demultiplexer for demultiplexing the data signal that is supplied from said second reception digital processing unit into a digital signal of a plurality of channels and supplying the result as output;

a second signal switch for receiving as input the digital signal of a plurality of channels from said second SDH demapping circuit and the digital signal of a plurality of channels from said second signal demultiplexer, and, based on settings that have been determined in advance, selecting and supplying a signal that is received from either path for each channel;

a second signal branch circuit for receiving a digital signal of a plurality of channels and a clock signal, branching only the signal of a channel that has been set in advance and supplying this branched signal to said second signal multiplexer, and supplying the signal of the other channels to said second SDH mapping circuit;

a first PDH interface circuit for extracting a clock signal from a PDH baseband signal that is received from a PDH baseband signal input terminal, converting said PDH baseband signal that has been received to a digital signal of a format that has been set in advance, and supplying as output the converted digital signal together with said extracted clock signal;

a second PDH interface circuit for converting a digital signal that has been received as input to a signal of a coding format that has been set in advance and supplying the converted signal from a PDH baseband signal output terminal; and a cross-connect circuit for branching a signal of a specific channel among a signal of a plurality of channels that have been received as input from said first and second signal switches and supplying the branched signal to said second PDH interface circuit; and inserting a signal that is received as input from said first PDH interface circuit to the signal of other channels and supplying the result to each of said first and second signal branch circuits.

2. An SDH add-drop multiplexer according to claim 1, wherein said second and fourth SDH interface circuits convert the data signals and clock signals that are supplied from said first and second SDH mapping circuits to an interface format that is prescribed by ITU-T G.703, and supply the converted signals from said first and second SDH signal output terminals, respectively.

* * * * *